US010805187B2

(12) United States Patent
Luuppala et al.

(10) Patent No.: US 10,805,187 B2
(45) Date of Patent: Oct. 13, 2020

(54) LOGGING OF TRAFFIC IN A COMPUTER NETWORK

(71) Applicant: CySec Ice Wall Oy, Tampere (FI)

(72) Inventors: Harri Luuppala, Lempäälä (FI); Aki Pitkäjärvi, Pirkkala (FI)

(73) Assignee: CySec Ice Wall Oy, Tampere (FI)

( * ) Notice: Subject to any disclaimer, the term of this patent is extended or adjusted under 35 U.S.C. 154(b) by 26 days.

(21) Appl. No.: 16/304,479

(22) PCT Filed: May 24, 2017

(86) PCT No.: PCT/FI2017/050394
§ 371 (c)(1),
(2) Date: Nov. 26, 2018

(87) PCT Pub. No.: WO2017/203105
PCT Pub. Date: Nov. 30, 2017

(65) Prior Publication Data
US 2019/0296990 A1 Sep. 26, 2019

(30) Foreign Application Priority Data
May 27, 2016 (FI) ...................................... 20165443

(51) Int. Cl.
*H04L 12/26* (2006.01)
*G06F 21/55* (2013.01)
*H04L 29/06* (2006.01)

(52) U.S. Cl.
CPC ............ *H04L 43/04* (2013.01); *G06F 21/552* (2013.01); *H04L 29/06* (2013.01); *H04L 43/12* (2013.01);
(Continued)

(58) Field of Classification Search
None
See application file for complete search history.

(56) References Cited

U.S. PATENT DOCUMENTS

2005/0091396 A1* 4/2005 Nilakantan ............. H04L 45/04
709/232
2006/0107047 A1 5/2006 Bar-El
(Continued)

FOREIGN PATENT DOCUMENTS

| JP | 2012533099 A | 12/2012 |
|----|--------------|---------|
| JP | 2014175699 A | 9/2014 |
| WO | 2002089426 A1 | 11/2002 |

OTHER PUBLICATIONS

Extended European Search Report issued in European Application No. EP17802262.0 dated Nov. 27, 2019, 8 pages.
(Continued)

*Primary Examiner* — Joshua Joo
(74) *Attorney, Agent, or Firm* — Ziegler IP Law Group LLC

(57) ABSTRACT

A method, system and computer program product for logging communication packets from a communication signal in a communication network. The communication network includes one or more perimeters. A split signal is formed of said communication signal, the communication signal including information, and the split signal being identical in information content to the communication signal. The communication packets of the split signal are captured using a network interface controller into a transitory memory. The network interface controller operates in real promiscuous mode. A virtual network interface controller may be operated from an isolated user space container, the isolated user space container having access to said transitory memory as an isolated memory range. The communication packets may be captured into the isolated memory range and the data of the communication packets may be written from the isolated memory range to the non-transitory memory.

17 Claims, 6 Drawing Sheets

(52) U.S. Cl.
CPC .......... *H04L 43/14* (2013.01); *H04L 63/1425* (2013.01)

(56) References Cited

U.S. PATENT DOCUMENTS

| | | | |
|---|---|---|---|
| 2007/0094643 A1 | 4/2007 | Anderson | |
| 2007/0248029 A1 | 10/2007 | Merkey et al. | |
| 2009/0147724 A1* | 6/2009 | Nimbalker | H04L 1/0069 370/315 |
| 2009/0199301 A1* | 8/2009 | Chandrasekaran | G06F 16/2358 726/27 |
| 2011/0087808 A1* | 4/2011 | Durand | G06F 13/28 710/26 |
| 2011/0141937 A1* | 6/2011 | Breslin | H04L 67/327 370/252 |
| 2011/0149298 A1 | 6/2011 | Arieli et al. | |
| 2012/0124200 A1 | 5/2012 | Ramadass et al. | |
| 2012/0158737 A1* | 6/2012 | Levy | G06F 16/9574 707/748 |
| 2012/0198030 A1* | 8/2012 | Wang | H04L 67/02 709/219 |
| 2013/0097369 A1 | 4/2013 | Talagala et al. | |
| 2013/0294259 A1* | 11/2013 | Lee | H04L 43/028 370/248 |
| 2013/0322266 A1* | 12/2013 | Maon | H04L 41/14 370/252 |
| 2013/0343390 A1 | 12/2013 | Moriarty et al. | |
| 2013/0347103 A1* | 12/2013 | Veteikis | H04L 43/04 726/22 |
| 2014/0101306 A1 | 4/2014 | Murgia | |
| 2014/0173154 A1 | 6/2014 | Sunkavalli et al. | |
| 2015/0046192 A1* | 2/2015 | Raduchel | G16H 10/65 705/3 |
| 2015/0264072 A1* | 9/2015 | Savchuk | H04L 43/026 726/23 |
| 2015/0378847 A1 | 12/2015 | Tarasuk-Levin et al. | |
| 2016/0050182 A1 | 2/2016 | Edross | |
| 2016/0105392 A1 | 4/2016 | Thakkar et al. | |
| 2016/0127276 A1 | 5/2016 | Wu et al. | |
| 2016/0239314 A1* | 8/2016 | Suryanarayana | H04L 69/16 |
| 2017/0222895 A1* | 8/2017 | Rachlin | H04L 41/0631 |
| 2019/0312904 A1* | 10/2019 | Stevens, IV | H04L 47/20 |

OTHER PUBLICATIONS

International Preliminary Report on Patentability, Application No. PCT/FI2017/050394, dated Sep. 3, 2018, 54 pages.
Written Opinion of the Searching Authority, Application No. PCT/FI2017/050394, dated Aug. 24, 2017, 10 pages.
Written Opinion of the International Preliminary Examining Authority, Application No. PCT/FI2017/050394, dated Jun. 4, 2018, 13 pages.
International Search Report, Application No. PCT/FI2017/050394, dated Aug. 24, 2017, 3 pages.
Japan Patent Office, Notification of Reason for Refusal, Application No. 2019514863, dated Jun. 16, 2020, 15 Pages.

* cited by examiner

LOGGING OF TRAFFIC IN A COMPUTER NETWORK

BACKGROUND

Computer network security is becoming more and more important. With advances in computing power of personal computers and other computing hardware, and the widespread use of networks connected to the internet, network security breaches have become rather commonplace. Yet, it is often the situation that a network owner may not even detect the intrusion, and therefore cannot take the necessary actions. In addition, if the intrusion is detected, it may not be clear to which extent the computer network security has been jeopardized and what data and parts of the computer network have been affected. For these and other reasons, even the legislators (e.g. in the European Union) are requiring companies to improve their abilities to detect and follow computer network intrusions.

There is, therefore, a need for solutions for logging traffic in a computer network.

SUMMARY

Now there has been invented an improved method and technical equipment implementing the method, by which the above problems are alleviated. Various aspects of the invention include a method, an apparatus, a server, a client and a computer readable medium comprising a computer program stored therein, which are characterized by what is stated in the independent claims. Various embodiments of the aspects of the present disclosure are in the dependent claims.

The aspects of the disclosed embodiments related to a method, system and computer program product for logging communication packets from a communication signal in a communication network. The communication network may comprise one or more perimeters that may be e.g. arranged at least partially so that a larger perimeter encompasses one or more smaller perimeters. A split signal may be formed of the communication signal, the communication signal comprising information, and the split signal being identical in information content to the communication signal. The split signal may be formed at a perimeter location of said communication network or at another location, for example such location where the network traffic concentrates. The communication packets of the split signal may be captured using a network interface controller into a transitory memory. The network interface controller may operate in real promiscuous mode. A virtual network interface controller may be operated from an isolated user space container, the isolated user space container having access to said transitory memory as an isolated memory range. The communication packets may be captured into the isolated memory range and the data of the communication packets may be written from the isolated memory range to the non-transitory memory.

Isolated user space containers may be utilized in the method. A virtual network interface controller may be operated from an isolated user space container, said isolated user space container having access to said transitory memory as an isolated memory range. Then, the communication packets may be captured into the isolated memory range of the isolated user space container, and the data of the communication packets may be written from said isolated memory range to said non-transitory memory. The isolated user space may comprise an isolated non-transitory memory range of said non-transitory memory, and the data of said communication packets may be written from said isolated memory range to said isolated non-transitory memory range of said non-transitory memory. The isolated user space container may belong to an isolated namespace, and external access may be provided to said isolated namespace and said isolated non-transitory memory range, wherein said external access is provided in read-only mode. The communication packets may be decoded by said network interface without filtering or coalescing packets, and an output data flow may be outputted identical in information content compared to said communication packets into said transitory memory. A device driver of said network interface controller may be used to write said communication packets to a circular buffer in said transitory memory, and a device driver of said non-transitory memory may be used to access said circular buffer in a direct memory access operation and to write said communication packets to said non-transitory memory. The non-transitory memory may comprise a plurality of memory units, said memory units forming a non-transitory memory system such as a wide stripe memory system, said writing to said non-transitory memory carried out to the non-transitory memory system. The communication network may comprise one or more perimeters and said split signal may be formed at a perimeter location of said communication network, and said capturing of communication packets may comprise capturing both inbound and outbound packets, internal packets at the perimeter location, and external packets arriving to the perimeter location from outside and said communication packets comprise essentially all network traffic flowing through and at said perimeter location in a time span. Also incomplete, incorrect and damaged packets may be decoded at least partially. The split signal may be formed at a location in the network between the local network and the wide area network through which location network traffic from the wide area network to the local network passes at the network operator routing point to the local network. The split signal may be formed by forming a second wave front portion of the input communication signal, said second wave portion being essentially simultaneous with the original wave front.

DESCRIPTION OF THE DRAWINGS

In the following, various embodiments of the present disclosure will be described in more detail with reference to the appended drawings, in which.

DESCRIPTION OF EXAMPLE EMBODIMENTS

Figure 1A:
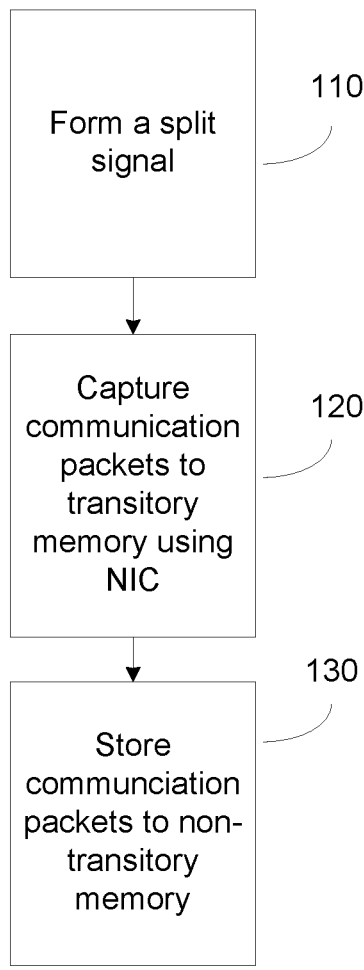
FIGS. 1a and 1b show flow charts for logging of computer network traffic with respect to creating and accessing the log.

In the following, several embodiments of the present disclosure will be described in the context of an example computer hardware arrangement and example computer hardware elements. It is to be noted, however, that the invention is not limited to any specific hardware or software. In fact, the different embodiments have applications in any environment where logging of computer network traffic is required, and they may be realized with different hardware and software arrangements. For example, the examples given in this description may be combined into any working combination for logging and analyzing computer network traffic.

In a packet data network, data is transferred in finite-length packets that contain the envelope and the payload. There are identifiers like the sender and receiver provided in a packet, as well as typically some information describing the payload. In a layered network model, the data are encapsulated into packets on several layers. For example, inside layer 2 packets, there are layer 3 packets. Packets of both layers contain the sender and receiver information: on layer 2, the MAC addresses are given and on layer 3, e.g. TCP/IP addresses are given. A packet is typically accompanied by an acknowledgement packet from the receiver to the sender. In this description, all such information may be captured as described later, that is, the packet addresses, sender and receiver information, whether the packet is an acknowledgement and so on.

In an attack or intrusion on a network, a variety of things may happen. For example, the packet and acknowledgement pairs may be mixed, packets may be incomplete or erroneous in format and content, longer than allowed, etc. The receiver network or system may operate incorrectly in response to incorrect network traffic, e.g. by allowing access to data or memory that is supposed to be beyond access. The attacker may use such vulnerability to gain control of the system. After that, or during the attack, the intruder may try to cover up the breach. For example, the system may be flooded by a large amount of data traffic, a so-called denial-of-service (DoS) attack to cover up a simultaneous intrusion. The intruder may alter system logs, or change the system time. These attacks take place in the form of communication packets. The attack may also be divided to multiple parts over time in a so-called component attack, where a single part may be difficult to detect and may not cause any harmful operation, but combined with later parts may then cause an attack. Such an attack may also be detected as described here.

In order to detect an intrusion, the incoming and outgoing communication packets may be monitored for such packets that are not part of normal traffic and that could be part of an intrusion attempt. When an intrusion is detected, however, there is no simple way of finding out when the intrusion has originally happened, and which parts of the system have been affected. If the network communication packets are saved e.g. by storing their sender, receiver and time information to a file, abnormal patterns may be detected from such a file. However, the intruder may seek to modify the file to cover up the way of intrusion and the parts of the system affected.

In this context, logging may be understood as the creation of a log in the form of digital data records in a computer memory, wherein the data records contain data of network traffic elements (e.g. packets) that have traveled through one or more logging points (here called split points) or on either side of such point during a specified time interval. The digital data records may comprise the data and header information of network traffic packets. The digital data records may also comprise metadata information such as time of logging, sizes and types of the data packets, as well as sender and receiver information for the data packets. The log may be collected from one or more logging points.

It has been noticed here in this invention that logging complete computer network traffic at or through a point may allow to analyze the breach in an improved manner. A split signal (as described later) may be formed of the network traffic at the point, and such a point may thus be considered a split point. When each packet and the acknowledgement to it are stored in the log, all the events related to the breach can be tracked back in time. This may be beneficial for example in attacks where the intruder has tried to cover traces of the attack in the system, or in a case where the attack comes in multiple parts (component attack).

For this purpose, the logging may take place in an isolated user space container. An isolated user space container does not allow uncontrolled access to data inside the controller. For example, to maintain authenticity of the evidence, the container may prevent other processes from writing to the log than the logger process. This way, the log cannot be modified and the events cannot be covered up or removed.

Figure 1B:
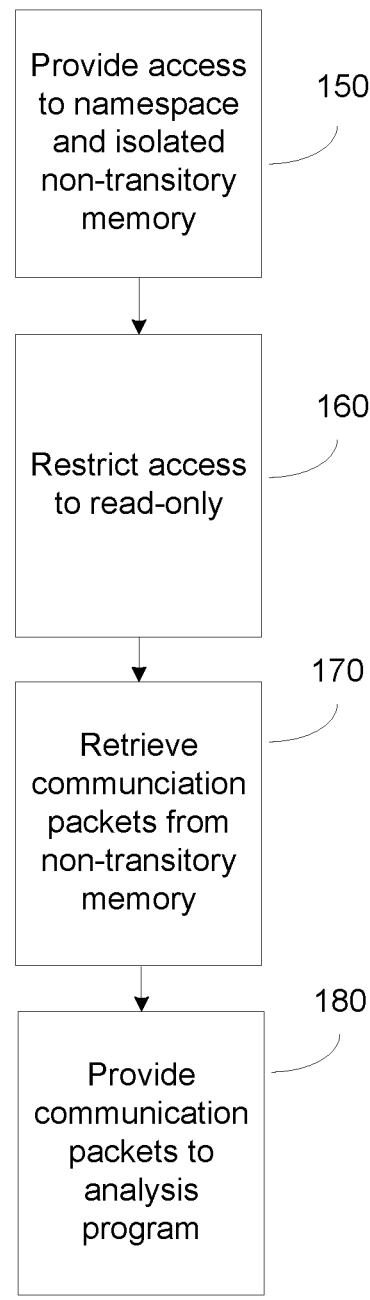

FIGS. 1a and 1b show flow charts for logging of computer network traffic with respect to creating and accessing the log. In FIG. 1a, the logging process of communication packets from a communication signal in a communication network is shown. The communication network may comprise one or more perimeters, that is, virtual borders or zones that separate the inside of a network segment from the outside of a network segment. Such perimeters may be arranged such that an inner perimeter is inside an outer perimeter. The perimeters may also be physically overlapping wholly or partially. A logging point may be set up in the perimeter. In phase 110, a split signal of the communication signal is formed. The split signal may be formed at a perimeter location of the communication network, that is inbound packets, outbound packets and/or packets that are traveling at the logging point on either side of the perimeter may be the source of the split signal. A point where the signal is split may be called a split point, as described later e.g. in the context of FIG. 2. The communication signal comprises information, as known in the art. The split signal may be made such that it is identical in information content to the communication signal. The split signal may also be formed at another point than a perimeter point, for example at a point where a wireless network connection is available or at any point where a large portion of the network traffic is obtainable. In other words, the split signal may be formed at any beneficial point, such as any point of convergence through which a significant portion of the network traffic flows, and/or at which a significant portion of the network traffic is available. There may be many such points of convergence in a network.

The split signal may be formed at a split point in a variety of ways. For example, a network element such as a router, a switch, firewall, threat management element, threat protection element, intrusion or threat detection element, electronical evidence collector, application delivery controller, base station, wireless or fixed network node, lawful interception gateway, remote control unit in a production control room, transmission control unit or vehicle communication node may be configured to copy network traffic it sees to a monitoring port (mirror port). Such a monitoring port may be set up through a management interface of the network element. There may be a dedicated management network for managing network elements, and the management network may be non-accessible through the network that carries the normal communication packets. There may also be a load balancing network. The networks may be separate. Also, a special signal splitter may be used, e.g. for optical communication, the signal may be detected (tapped) from the optical signal traveling in an optical fiber e.g. by means of an optical signal splitter. The split point (e.g. network element) may avoid operating on the split signal in any way, and it may just forward the signal to the NIC. This preserves the authenticity of the signal, and it may also avoid causing processing load to the network element.

In phase 120, communication packets of the split signal may be captured using a network interface controller and saved temporarily into a transitory memory, for example, well known random access memory (RAM) of a computer that is connected through a bus to other components like processor and a network interface controller. The network interface controller may operate in real promiscuous mode, that is, in a mode where it captures every packet that it detects at its network interface regardless of where the packet is intended to travel or who is the recipient. The network interface controller may be configured to operate such that it does not transmit any network communication towards the network, e.g. it may be disabled by software or physically to transmit, or the connection from the NIC towards the network may be omitted in the network cable between the NIC and the network, or in some other way. The network interface controller may be configured such that it has no network address or has only low-level network address (MAC address). The network interface controller may thus operate differently from a network interface controller in normal mode, since in normal mode the network interface controller responds to communication packets it sees. Because the network interface controller here may be silent towards the network, the reliability of the logging may be improved, as the communication is unaltered. Furthermore, the network traffic is not disturbed and the network load is not increased if the NIC is not transmitting communication packets to the network. It has been noticed here that in writing the data to the transitory memory, the technical problem of transfer speed between the network interface controller and the memory needs to be solved, as well as the technical problem of reading the data from the transitory memory. Furthermore, the size of the transitory memory is typically rather limited compared to the amount of network communication data.

In phase 130, data of the communication packets may be written to a non-transitory memory so that they can be stored for longer times and later retrieved for analysis if an intrusion needs to be analyzed. A non-transitory memory may be for example traditional hard disk storage, solid-state drive storage (flash memory) or another type of memory such as an optical memory. It has been noticed here that in writing the data to the non-transitory memory, a technical problem of write speeds needs to be overcome. That is, the transitory memory is typically clearly faster in read and write speeds than non-transitory memory.

In the above, the problems of write and transfer speed may cause the system to be unreliable, that is, to lose communication packets, unless special technical measures are taken. Such arrangements are described later.

The logging of communication packets may comprise operating a virtual network interface controller from an isolated user space container. An isolated user space container is an environment for running processes and applications. This environment may coexist with other environments, and they may share the same operating system kernel space, that is, there is one instance of the operating system and multiple instances of user space containers on top of the operating system. The different user space containers are isolated from each other so that it is not possible to access a user space container from within another user space container. The user space containers may have their dedicated transitory memory space, non-transitory memory space and process trees to implement this isolation. An isolated user space container may thus have access to the transitory memory as an isolated memory range. The communication packets may be captured into the isolated memory range of the isolated user space container. In this manner, the communication packets may be accessed by an authorized process of the operating system kernel. Further, the data of the communication packets may be written from the isolated memory range to the non-transitory memory. The isolated user space may comprise an isolated non-transitory memory range of the non-transitory memory. The data of the communication packets may be written from the transitory memory to this isolated memory range.

The names, definitions, addresses etc. may be defined so that they refer to the isolated user space container and not to other user space containers, that is, they define a namespace for the user space container. That is, the isolated user space container may belong to an isolated namespace. A namespace is the context in which any program or process running on the computer system may access resources of the system or address (request) resources outside the system. An operating system kernel manages the namespace, that is, it assigns handles that programs can use to access a specific resource. The operating system may also allow access to outside of the operating system (through a communications connection) to access a resource in another system. Furthermore, the operating system may allow access from outside to the resources of the system.

In FIG. 1*b*, the accessing of the logged communication packets is shown. In phase 150, access to the isolated namespace and the isolated non-transitory memory range may be provided. In phase 160, or as the access is provided in phase 150, the external access may be restricted to read-only, that is, writing data to the non-transitory memory may be prevented. In phase 170, communication packets and information on the packets may be retrieved from the non-transitory memory. This information may be provided to an analysis program in phase 180 to provide an analysis result of the type, source, time, target or other characteristics of the intrusion.

Figure 2:
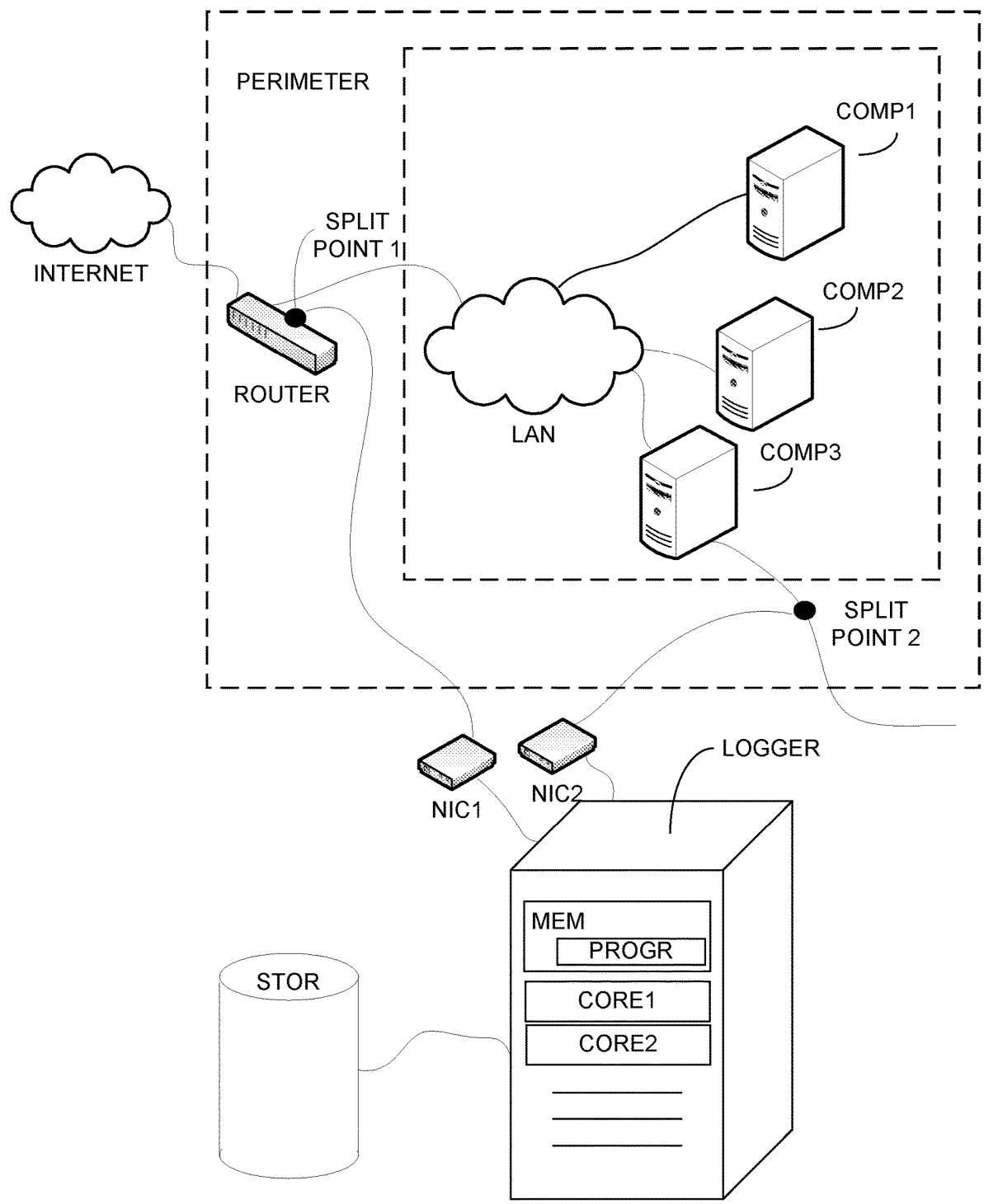
FIG. 2 shows a system and devices for logging of computer network traffic.

FIG. 2 shows a system and devices for logging of computer network traffic. The monitoring may, for example, be done so that one or more split points SPLIT POINT 1, SPLIT POINT 2 are set up at perimeter locations PERIMETER in the network topology so that the network traffic traveling through this point or these points is an essential part of all network traffic in and out from a local network LAN, or a split point may be set up at any point of convergence. The "local network" can be defined to be e.g. a facility or organization, for example an internal network of the company, or it can be understood to be a subsection of a company's internal network, such as the network of a department, or even a single computer COMP1, COMP2, COMP3. A perimeter location may comprise a location SPLIT POINT 1 in the network between the local network LAN and the wide area network INTERNET through which the network traffic from the wide area network to the local network LAN passes at the network operator routing point ROUTER to the local network. In other words, the perimeter location of a local network may physically reside in the network operator's premises that are separate from the physical location and extent of the local network. In other words, the perimeter location may be at a physical perimeter of a facility or it may be at a network perimeter of a network segment, wherein the network perimeter may be located physically in the same location as the local network or at a remote location (connected via a communications connection). This provides the possibility of the network operator to monitor and log network traffic to and from the local network.

The logging of communication packets comprises capturing both inbound and outbound packets, internal packets at the perimeter location, and external packets arriving to the perimeter location from outside and said communication packets comprise essentially all network traffic flowing through and at said perimeter location in a time interval. Correspondingly, at any convergence point, all packets that are visible at the convergence point are captured regardless of their origin or destination.

At the split point SPLIT POINT 1, SPLIT POINT 2, the network traffic is split into two or more identical and coexisting streams of traffic. Splitting may happen, for example, electrically or optically, and the formed split network streams are identical in information content. These streams exist and propagate essentially simultaneously (e.g. with less than a millisecond of time difference) in the different paths of the computer network and system. In other words, the different wave fronts of the signal may have different timing if the signal path causes delay, for example due to a rise time of a semiconductor component or such. If the delays accumulate, the difference in timing may be of the order of milliseconds or tens of milliseconds, or even in the order of seconds. This way, the split signal is formed by forming a second wave front portion of the input communication signal, the second wave portion being essentially simultaneous with the original wave front. Other ways of splitting the signal may comprise, for example, quantum-computing-based state splitter, and/or splitting a communication signal carried by magnetic field, electric field, electromagnetic radiation like light, infrared, radio frequency wave.

A network interface controller NIC1, NIC2 may then operate in such a way where it captures all traffic packets regardless of their headers or content and sends this information forward to the normal destination as well as to the recording path of the computer system LOGGER (promiscuous mode). When a communication signal comprising communication packets arrives at a split point, the signal is split by a signal splitter or by the network interface controller NIC1, NIC2 to form a split signal. The communication packets of the split signal may then be captured into a transitory computer memory MEM using a network interface controller NIC1, NIC2 that may operate in real promiscuous mode. The network interface controller may thus receive a data stream from the communication network and store the data stream to the memory MEM. The network interface controller may be silent towards the network, that is, the network interface controller may be configured by software or hardware to omit transmissions or responses towards the network. The data of the communication packets are subsequently written to a non-transitory memory STOR. The network interface controller may forward an identical packet flow to output compared to the network interface controller input packet flow (real promiscuous mode), to be written to the non-transitory memory STOR. The network interface controller may decode the communication packets. The controller may avoid filtering or coalescing packets to maintain the original communication signal packet flow as closely to original packet flow as feasible. Such a packet flow that is identical or to a great degree identical to the original is then stored (logged).

The method for recording the network traffic can be realized with software code PROGR in memory MEM running on one or more processor cores CORE1, CORE2 in a server computer LOGGER. The server computer may comprise or it may be connected to a network interface controller for splitting the network traffic. The server may comprise or it may be connected to a data storage (a non-transitory memory system), e.g. a RAID drive operating in striped mode or so called wide stripe mode.

Figure 3:
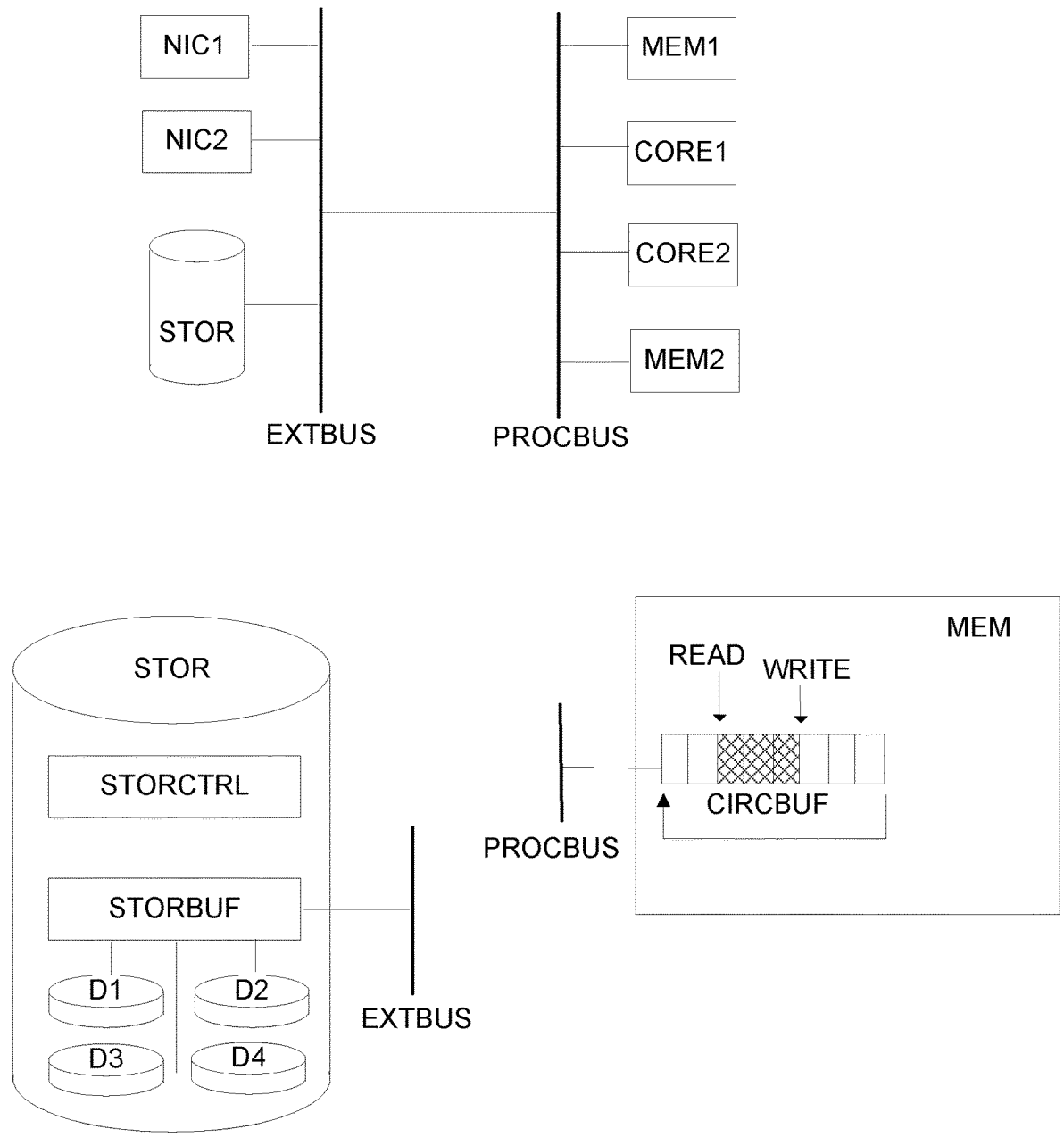
FIG. 3 shows a block diagram of an apparatus for creating a log of network traffic.

FIG. 3 shows a block diagram of an apparatus or system for creating a log of network traffic. Recording of network traffic starts at the splitter where the stream of network traffic communication packets is split to form a split stream. The split stream is captured by a network interface card NIC1, NIC2 and written to the transitory memory MEM1, MEM2 (commonly MEM) of the network interface controller computer. A circular buffer CIRCBUF direct memory operation controlled by the network interface controller may be used to write the split network traffic stream packets to the transitory memory MEM1, MEM2. This circular buffer is read by a process executed by one or more processor cores CORE1, CORE2 and transferred to a buffer memory STORBUF of a non-transitory memory STOR, e.g. a hard drive storage such as a wide stripe storage system, an optical storage media, a solid state disk or any other system where the data stays written even if there is no external power supply to the non-transitory media. From the buffer memory STORBUF, the data is written to the non-transitory memory D1, D2, D3, D4, controlled by a controller STORCTRL. Such an arrangement allows for sufficient speed so that an image of the full network traffic stream can be captured to the permanent storage without packet losses, and, consequently, the stored stream may be used as a reliable forensic evidence source. The logged stream may be written to the non-transitory memory in multiple segments so that one segment can be efficiently written to the non-transitory memory, e.g. to one storage unit. Also, the segments can be formed into independent data units that can be time-stamped and verified by hash code or digital signature. In this manner, when more speed or capacity is needed, storage units can be added to the non-transitory memory, and this enables more data units to be written simultaneously to the non-transitory memory.

A device driver of the network interface controller may write the communication packets to a circular buffer in the transitory memory MEM. A device driver of the non-transitory memory may access the circular buffer CIRCBUF in a direct memory access operation and write the communication packets to the non-transitory memory or to a buffer memory of the same. The non-transitory memory may comprise a plurality of memory units, the memory units forming a non-transitory memory system such as a RAID or wide stripe system.

A circular buffer may be understood to be an arrangement where data is written to a memory range, and when the end of the memory range is reached, the writing continues from the beginning of the memory range. The memory range can be contiguous or non-contiguous. In the writing, there may be two addresses used continually: the write address WRITE and the read-out address READ. As more data is written to the circular buffer, the write address advances correspondingly, and jumps back to the beginning of the memory range when the end of the memory range is reached. As data is being read out from the circular buffer, the read-out address advances correspondingly, and jumps back to the beginning of the memory range when the end of the memory range is reached. If the read-out address reaches the write address, reading is stopped until more data is available. If the write address reaches the read-out address, this is an error condition, since the circular buffer has become full and no more data can be written until data is read out from the buffer. For the circular buffer to avoid overflow, the read-out speed should be sufficiently high, and at least higher than the average data flow speed. Furthermore, the circular buffer may be sufficiently large in size so that it can contain one or more write bursts.

In this context it needs to be understood that the storage of the network stream may happen essentially without delay, save for the circular buffering and writing delay to the permanent storage. Also, the packets may be stored without filtering, coalescing and/or altering the packets in any way. That is, the network interface controller operates in a mode where the network interface controller decodes communication packets from incoming communication signal without filtering, e.g. not dropping packets by MAC address or protocol and does no coalescing of packets. Also incomplete, incorrect and damaged packets may be decoded by the NIC at least partially or to the degree possible. In this manner, an authentic packet flow is captured. This provides in an evidentiary sense a watertight recording. All packets regardless of sender and recipient or protocol are decoded.

Alternatively or in addition, during the storage process, for example another processor core CORE1, CORE2 may be employed to form a comprehensive header log of the split network stream. In the header log, the packet headers (including the addresses) are stored, but the payload of the packets is not. This header log can be formed also in text format so that it is human-readable. Such a header log can be provided as an output to be a basis for analysis of the network traffic, and if more detailed analysis of the packets, e.g. of the payload, is needed, the full image of the network traffic stream can be accessed.

It has been noticed here that the approach of FIG. 3 may provide a reliable and scalable way of logging communication network traffic. Forming a split of the network communication packets and logging and storing the split signal by a separate hardware may, for example, be superior compared to logging network traffic by a network element such as a router or switch that is part of the communication network. An intruder may be able to attack such a network element by overloading the element with traffic, and in such a case, the network element might not have enough processing power to handle the logging. Consequently, an intrusion may be left undetected. Another advantage of the approach of FIG. 3 may be that forming split points in the network and handling the logging with a dedicated hardware allows flexibility in configuring the logging, and may also save cost and power consumption, because such additional functionality is not required in the network elements themselves. In other words, such an arrangement may be more scalable than one based on functionality in the existing network elements. Depending on the number of split points and the amount of network traffic to be monitored, different types of dedicated hardware may be used for the logging. For example, a miniature computer costing less than 100 euros may be used to monitor, say, network traffic of a small office or a home. A powerful server may enable the monitoring of a significantly larger network of a company, and server farms may be utilized to have a number of computers monitoring a large network of computers and a large amount of network traffic.

The dedicated hardware may be e.g. a personal computer of the contemporary PC hardware architecture or a corresponding server computer, that is, a general purpose computer instead of a network element like a router or a network switch. In contemporary architectures, an expansion bus EXTBUS like a PCIe bus carries data and commands between the processors and the network interface controller(s) and it has sufficient communication speed for handling the logging of all network traffic at a split point. The communication bus may be attached to a processor bus PROCBUS like a QPI bus at the computation nodes (processors), and the nodes may be attached to the transitory memory MEM1, MEM2 (random access memory RAM), e.g. such that each node has 2 memory banks. The transitory memory (RAM) may have, as described above, a circular buffer defined as address space for the network interface controller driver to write to. The data recorder process may define the address range to be used for the circular buffer. This kind of an arrangement may provide a speed of 200 MB/s going to the non-transitory memory. To receive such a high speed data flow, there may be e.g. a RAID wide stripe storage system that has high enough write speeds, e.g. by employing 4096 byte blocks with rotating storage to individual storage units.

A program such as a daemon process may control the logging of network traffic from the network interface controller to the non-transitory memory in a manner described above. The network interface controller may keep count of data amounts and number of packets passing through the network interface controller, and this data may be stored to the non-transitory memory, too. Losing some packets in the logging process may not be harmful to a detection and investigation of an intrusion, but it is important that nothing may be added to the non-transitory storage later, and that there is no access to delete packets from the non-transitory storage. Time stamps and timing information of packets and traffic may also be stored, because changes in network time may enable attacks, and by storing the time stamps and/or timing information such attacks may be caught, as well.

Figure 4A:
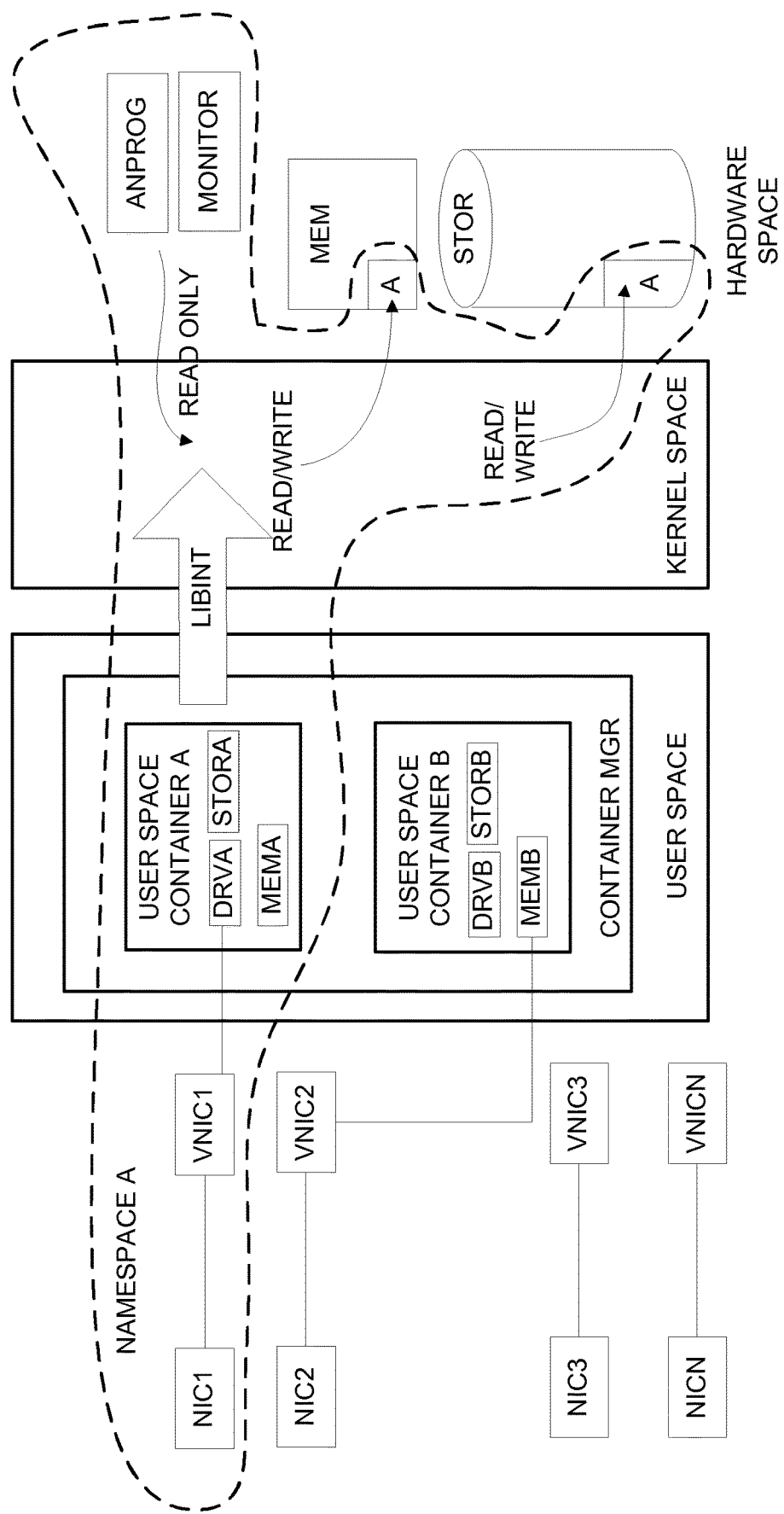
FIG. 4a shows an arrangement for creating and accessing a log of computer network traffic with the help of namespaces.

FIG. 4a shows an arrangement for creating and accessing a log of computer network traffic with the help of namespaces and isolated user space containers.

A namespace as NAMESPACE A in FIG. 4 may be understood to be a data structure and system for naming objects in a computer environment. For example, network addresses and logical names of devices in a computer are identifiers that can be used by programs to refer to the corresponding elements. The use of a namespace seeks to ensure that there are no name conflicts in the namespace, and simultaneously disables reference to items that are beyond the namespace.

A user space container as USER SPACE CONTAINER A and USER SPACE CONTAINER B in FIG. 4 may be understood to be a virtualization environment where services of the operating system are provided as generic services so that a program running in the user space container has no direct access to the operating system but instead accesses the operating system through these services over an interface LIBINT. As is well known, the operating system and the device drivers associated with the operating system provide the services of the computer hardware as generic services such that a program may not need or may not be allowed to access hardware directly. There may be several user space containers on top of a single operating system, and the user space containers are isolated from each other such that programs in one container cannot access resources of another container. The names and objects accessible inside a container may be non-accessible from other containers. Also, the operating system and the container manager CONTAINER MGR may restrict access from a container to the resources provided by the operating system. For example, the operating system may prevent write access to a non-transitory memory (disk storage) from a user space existing for analysis purposes. This may be useful for providing a reliable and secure logging of network communication in a system that provides a scalable way of carrying out logging.

The process isolation described above and other access restrictions may be achieved by the use of control groups and namespaces. For example, a container may be provided with only certain rights to a non-transitory memory (e.g. read-only rights to a certain range or mount point) by using a mount namespace. The containers may have their unique host name by using a specific namespace, and may have access to inter-process communication objects (e.g. shared memory) by another namespace. Processes in different containers may be numbered independently with the help of process id namespace, and a network namespace may provide the system resources for the container's network functionalities. In such a manner, a namespace may be understood to provide certain resources to be visible to the container. Control groups may be used to provide access to certain system resources, e.g. processing time, memory amount or range, and network bandwidth. For example, if a container is not given any processing time, that is, it does not have a property that it would be able to use processing time, processes are not run in such a container, but the container may still provide access to a data storage through pointers. If a container is not given write access to a non-transitory memory range, it can only provide read access to the data. Such capabilities are formed when the container is started. This provides security against unauthorized access, because re-starting a container may not be allowed in a configuration, and may not be possible from inside the container. Also, the operating system kernel may be running in a certain configuration, and changing the configuration may be possible only by re-starting the kernel, or even by recompiling and restarting the kernel. Such operations require strong rights that are not usually easily available.

In the present description, the network interface controller may provide the network communication data to a memory range that is reserved for the operating system kernel and thus the kernel processes can access the data. A certain range of the memory MEM may be reserved in such a manner. The system may be configured to operate such that the transfer of data from the transitory memory to the non-transitory memory takes place through direct memory transfer and the processor load may be minimized.

Another known type of virtualization is hardware virtualization, where a virtual computer is created on top of a host operating system running on a computer hardware such that the computer hardware services are provided as services to the virtual computer. That is, a guest operating system installed in the virtual computer uses the virtual hardware as if it were real hardware. There may be several virtual computers running on top of any hardware and host operating system.

Virtual computers and user space containers may be nested such that one or more user space containers are running on an operating system of a virtual computer. In FIG. 4a, there is one set of computer hardware shown, and one operating system environment with its kernel space KERNEL SPACE (namespace of the operating system kernel). On top of the operating system, a number of user space containers USER SPACE CONTAINER A, USER SPACE CONTAINER B may be provided with their respective namespaces.

A virtual network interface controller VNIC1, VNIC2, VNIC3, VNICN may provide the interface to a real network interface controller NIC1, NIC2, NIC3, NICN that acts as a receiver of network communication packets from a split point. Such a virtual network interface controller may be operated from within an isolated user space container, through its driver DRVA, DRVB, for example by a control program (logger program) for controlling the network packet logging. The isolated user space container may have access to the transitory memory as an isolated memory range MEMA, MEMB provided to it by the operating system (or container manager). That is, programs inside the container may read and write to the transitory memory range, but the memory range is not accessible from another container. The communication packets may be captured into the isolated memory range MEMA, MEMB of the isolated user space container, e.g. by controlling a circular buffer direct memory access operation of the network interface controller. From the transitory memory, the communication packets may be written to the non-transitory memory. The non-transitory memory may be provided by the operating system to the container as an isolated non-transitory memory range STORA, STORB, as well. The isolated user space comprising an isolated non-transitory memory range, the communication packets may be written from the isolated transitory memory range to the isolated non-transitory memory range of the non-transitory memory. The memory ranges for user space container A are also shown on the devices STOR and MEM as a corner "A".

As shown in FIG. 4a, the isolated user space container belongs to an isolated namespace, and external access to the namespace and the isolated non-transitory memory range may be provided, wherein the external access is provided in read-only mode. In other words, there may be provided a way to mount the isolated non-transitory memory range to be visible to an analysis program ANPROG for analyzing the past network traffic logged on the non-transitory memory. Also, status of the logging may be monitored in read-only mode by a monitoring program MONITOR.

The computer program product may be arranged to run in a namespace, wherein the storage, operating system, virtualized hardware and the network connections form a sufficient realm for accessing the stored stream. While for recording the namespace is available for writing, the namespace can be provided in a read-only access mode, too, for example for forensic analysis purposes. In such way, the total recorded network traffic stream can be accessed for reading, but forensic value is not harmed by the access (read-only). This provides a reliable way of logging the network communication as well as a reliable way of accessing the logged data.

Figure 4B:
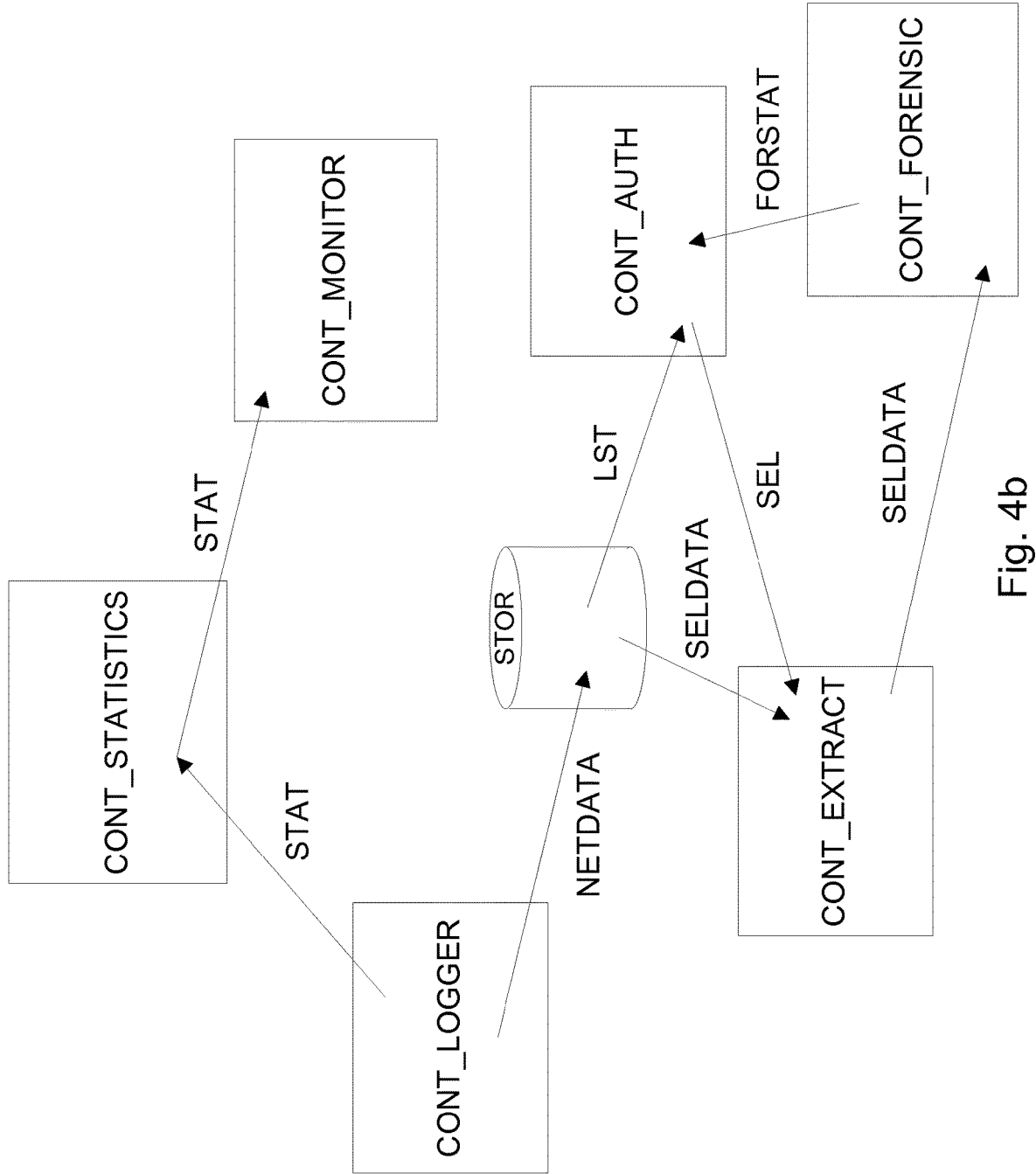
FIG. 4b shows an arrangement for authorizing access to logged network traffic.

The above operations of FIGS. 3, 4a and 4b may be implemented—together with appropriate computer hardware, as explained—as a computer program product embodied on a non-transitory computer readable medium, comprising computer program code configured to, when executed on at least one processor, cause an apparatus or a system to form a split signal of a communication signal, the communication signal comprising information, the split signal being identical in information content to the communication signal, and the split signal being formed at a perimeter or convergence location of the communication network, capture communication packets of the split signal using a network interface controller into a transitory memory, the network interface controller operating in real promiscuous mode, and write data of the communication packets to a non-transitory memory.

The computer program product may comprise computer program code to operate a virtual network interface controller from an isolated user space container, the isolated user space container having access to the transitory memory as an isolated memory range, capture the communication packets into the isolated memory range of the isolated user space container, and write the data of the communication packets from the isolated memory range to the non-transitory memory.

Some practical details for forming and providing the logged network packets for analysis are provided in the following. For recording, a container is formed in a recording namespace, comprising the virtual network interface controller corresponding to the real network interface controller, the transitory and non-transitory memory ranges and the control program for logging. In reading the logged data, a reader control program ANPROG may be attached to the container which operates in read-only mode, comprising analysis tools or providing access to the data for analysis tools. The storage container may comprise an identifier that has been written to it during logging, for example derived from the identifier of the network interface controller from which the communication traffic has been logged. The storage may comprise a hash or CRC or another verification code that shows that the storage has not been tampered with (the corresponding code can be stored to a secure location at recording time).

Such containers may be used to build domains to allow one physical machine to be used for multiple network logging operations. For example, if a network operator is providing a service to log a plurality of networks, there may be logging containers for each network on one physical machine. This provides reliability, because the physical machine may be built to have high performance, and at the same provide cost savings as the network elements may be made more simple. Therefore, in an environment where one or more networks are logged at a plurality of split points, such container and namespace arrangement can simplify the implementation of the logging. In other words, such an arrangement may be more scalable than one where the functionality is built in the network elements themselves.

In FIG. 4b, an arrangement for authorizing access to logged network traffic is shown. There may be a number of user space containers (elements named with prefix CONT) that are arranged to communicate with each other. The user space container for logging network traffic CONT_LOGGER carries out the functionalities related to receiving network traffic packets into the transitory memory and writing this data NETDATA to the non-transitory memory STOR. The logger CONT_LOGGER communicates with the user space container for gathering statistics CONT_STATISTICS, which in turn provides the statistics STAT to a monitor container CONT_MONITOR for monitoring the progress of the logging. No other containers may be allowed to write to the non-transitory storage. Data of the logged network traffic in the non-transitory storage is stored as data segments that each have an identifier (name) by which they can be accessed. An authorization container CONT_AUTH is allowed to read these names as data LST and allow a user to select the segments to be analyzed. The authorization container provides this selection SEL and an authorization to the extraction container CONT_EXTRACT so that the data SELDATA of the selected segments can be retrieved to be available. The extraction container CONT_EXTRACT provides the data SELDATA to the forensic analysis container CONT_FORENSIC, which in turn reports back to the authorization container the progress of the analysis.

As an example, logged data can be analyzed by reading the data and finding patterns that match to known intrusion methods. As another example, a logged network traffic can be played back through an on-line network traffic analyzer that is arranged to detect network intrusions. This way, when the network traffic analyzer has been updated to detect new intrusion methods, an older traffic can be analyzed afterwards by playing in through the updated analyzer.

Figure 5:
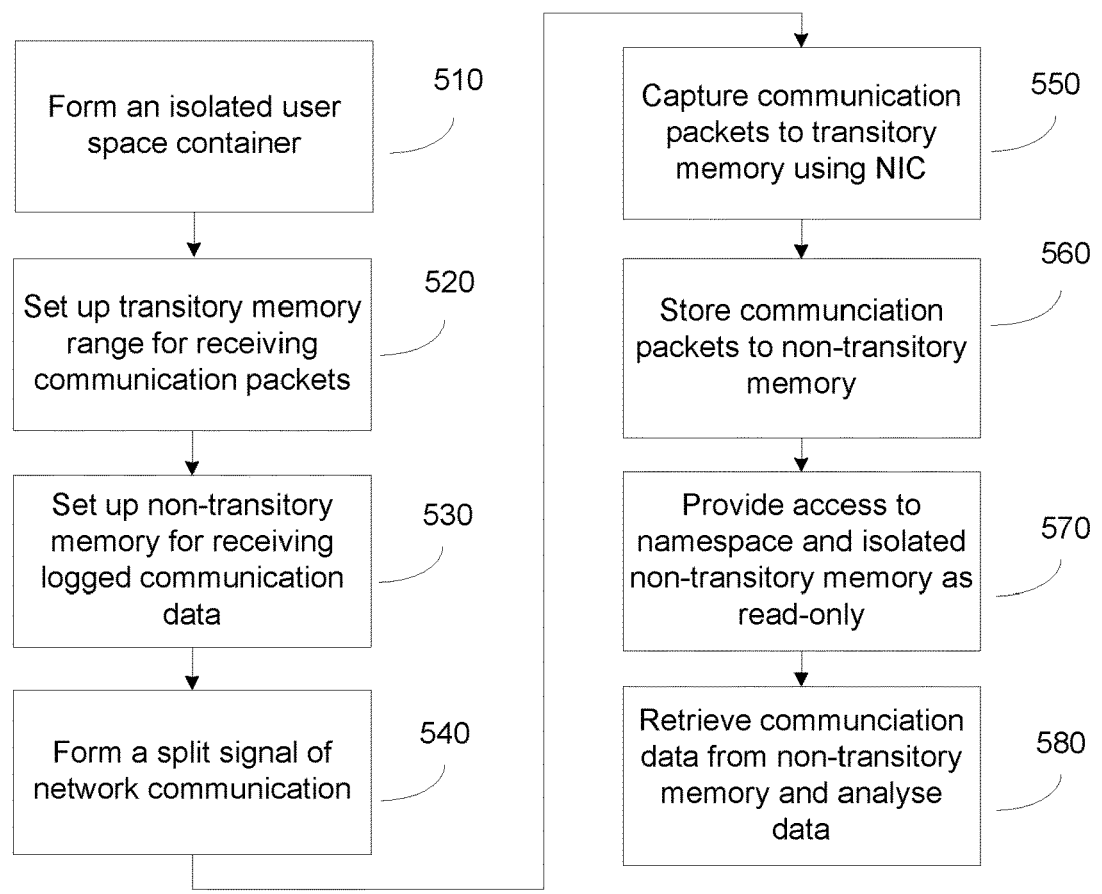
FIG. 5 shows a flow chart of logging and analyzing computer network traffic.

FIG. 5 shows a flow chart of logging and analyzing computer network traffic. In the figure, the individual phases may be carried out as explained earlier, or they may be modified or omitted. Different combinations of the phases in different order may be carried out. For example, the method may be carried out without the use of isolated user space containers, or it may be carried out with the help of virtual computers. In phase 510, an isolated user space container is formed. The user space container may comprise an isolated transitory memory range and/or an isolated non-transitory memory range. In phase 520, the transitory memory range may be set up to have a circular buffer to which the network interface controller can write the communication packets. In phase 530, a non-transitory memory may be set up for storing the network communication, and the non-transitory memory may comprise a memory system comprising a plurality of memory units. In phase 540, a split communication signal may be formed from the communication signal at a network perimeter or convergence location. In phase 550, the split signal may be captured to transitory memory and into the circular buffer, and the capturing may comprise decoding communication packets, for example intact communication packets and incomplete or erroneous packets. In phase 560, data of the communication packets may be written from the transitory memory to the non-transitory memory. In phase 570, a read-only external access may be provided to the container, for example by starting the container in read-only mode. In phase 580, logged communication may be analyzed with the help of an analysis program.

Figure 6:
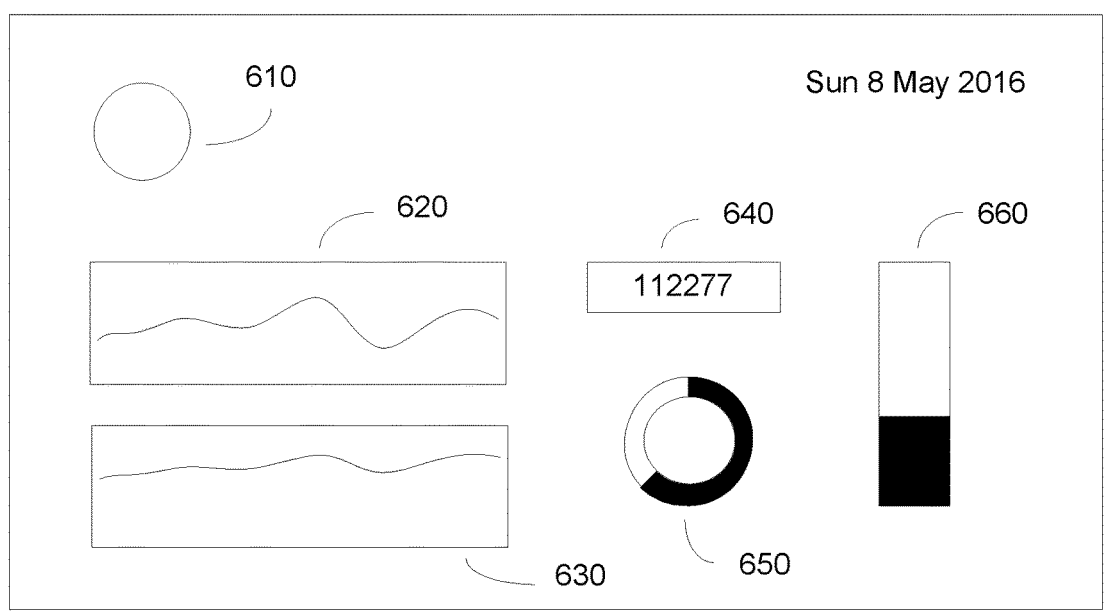
FIG. 6 shows a user interface of computer program product for logging computer network traffic.

FIG. 6 shows a user interface 600 of computer program product for logging computer network traffic. There may be such a monitor application in the container comprising the isolated user space for the purpose of showing the status of the recording. The monitor application may, for example, be connected to the network interface controller, the control program controlling the logging, and/or to the non-transitory memory. As shown in FIG. 6, the monitor application may show with a first indicator 610 indicating whether logging is being carried out, may indicate the amount of data with a second indicator 620 and number of packets logged with a third indicator 630, and/or compare the number of packets received by the network interface controller and the non-transitory memory to determine whether packets have been lost in logging, and indicate the amount of lost packets with a fourth indicator 640. There may also be indicators for indicating other things in the internal state of the logging, for example the status of the circular buffer (indicator 650), fullness of the non-transitory storage (indicator 660), and so on. Such status of the logging as described here may also be stored, and displayed later in the analysis phase with a similar user interface 600.

The above method and associated devices may provide advantages. For example, when new security vulnerabilities are found, it is not known how long such vulnerabilities have been used for security attacks (before the moment of finding them). With this method of storing the full network traffic stream image, the past network traffic can be analyzed to find what has happened and to detect the moment the vulnerability was first used. For example, the backup records to be used in restoring the network and attached computers may also be tainted. The storing and analysis can be carried out without opening the payload, which may make the method compliant to laws in most countries. Automatic analysis of network traffic headers may be carried out, for example. In the way described above, a new product provides a way to monitor and record all incoming and outgoing network traffic at a certain location.

The various embodiments of the invention can be implemented with the help of computer program code that resides in a memory and causes the relevant apparatuses to carry out the invention. For example, a device may comprise circuitry and electronics for handling, receiving and transmitting data, computer program code in a memory, and a processor that, when running the computer program code, causes the device to carry out the features of an embodiment. Yet further, a network device like a server may comprise circuitry and electronics for handling, receiving and transmitting data, computer program code in a memory, and a processor that, when running the computer program code, causes the network device to carry out the features of an embodiment.

It is clear that the present disclosure is not limited solely to the above-presented embodiments, but it can be modified within the scope of the appended claims.

The invention claimed is:

1. A computer system comprising at least one processor, memory including computer program code, the memory and the computer program code configured to, with the at least one processor, cause the system to:
   form a split signal of a communication signal at a split point in a communication network, said communication signal comprising information, said split signal being identical in information content to said communication signal,
   receive said split signal by a network interface controller from said split point;
   capture communication packets of said split signal using said network interface controller into a transitory memory in a direct memory access operation without filtering or coalescing said communication packets by said network interface controller, said network interface controller operating in real promiscuous mode,
   read data of said communication packets from the transitory memory in a direct memory access operation;
   write data of said communication packets to a non-transitory memory in a direct memory access operation so that the data of said communication packets is identical in information content to said communication signal;
   form a verification code on the basis of said communication packets configured to be used to show that the data of said communication packets in the non-transitory memory has not been tampered with;
   store the verification code to a secure location;
   operate a virtual network interface controller from an isolated user space container, said isolated user space container having access to said transitory memory as an isolated memory range,
   capture said communication packets into said isolated memory range of said isolated user space container, and
   write said data of said communication packets from said isolated memory range to said non-transitory memory.

2. The computer system according to claim 1, wherein said isolated user space-container comprises an isolated non-transitory memory range of said non-transitory memory, the system further comprising computer program code to cause the system to:
   write said data of said communication packets from said isolated memory range to said isolated non-transitory memory range of said non-transitory memory; and
   provide external access to said isolated namespace and said isolated non-transitory memory range, wherein said external access is provided in read-only mode.

3. The computer system according to claim 1, further comprising computer program code to cause the system to:
   decode said communication packets by said network interface controller,
   output an output data flow identical in information content compared to said communication packets from said network interface controller into said transitory memory.

4. The computer system according to claim 1, further comprising computer program code to cause the system to:
   use a device driver of said network interface controller to write said communication packets to a circular buffer in said transitory memory, and
   use a device driver of said non-transitory memory to access said circular buffer in the direct memory access operation and to write said communication packets to said non-transitory memory.

5. The computer system according to claim 1, wherein said communication network comprises one or more perimeters and said split signal is formed at a perimeter location of said communication network, and said capturing of communication packets comprises capturing both inbound and outbound packets, internal packets at the perimeter location, and external packets arriving to the perimeter location from outside and said communication packets comprise essentially all network traffic flowing through and at said perimeter location in a time span.

6. The computer system of claim 1, further comprising computer program code to cause the system to:
   decode incomplete, incorrect and damaged packets at least partially.

7. The computer system of claim 1, wherein said split signal is arranged to be formed at a location in the communication network between a local network and a wide area network through which location network traffic from the wide area network to the local network passes at a network operator routing point to the local network.

8. A method of logging communication packets from a communication signal in a communication network, said method comprising:
   forming a split signal of a communication signal at a split point in a communication network, said communication signal comprising information, said split signal being identical in information content to said communication signal,
   receiving said split signal by a network interface controller from said split point;
   capturing communication packets of said split signal using said network interface controller into a transitory memory in a direct memory access operation without filtering or coalescing said communication packets by said network interface controller, said network interface controller operating in real promiscuous mode,
   reading data of said communication packets from the transitory memory in a direct memory access operation;
   writing data of said communication packets to a non-transitory memory in a direct memory access operation so that the data of said communication packets is identical in information content to said communication signal;

forming a verification code on the basis of said communication packets to be used to show that the data of said communication packets in the non-transitory memory has not been tampered with;

storing the verification code to a secure location;

operating a virtual network interface controller from an isolated user space container, said isolated user space container having access to said transitory memory as an isolated memory range, capturing said communication packets into said isolated memory range of said isolated user space container, and writing said data of said communication packets from said isolated memory range to said non-transitory memory.

9. The method according to claim 8, wherein said isolated user space container comprises an isolated non-transitory memory range of said non-transitory memory, said method comprising:

writing said data of said communication packets from said isolated memory range to said isolated non-transitory memory range of said non-transitory memory.

10. The method according to claim 9, wherein said isolated user space container belongs to an isolated namespace, and said method comprises:

providing external access to said isolated namespace and said isolated non-transitory memory range, wherein said external access is provided in read-only mode.

11. The method according to claim 8, comprising:

decoding said communication packets by said network interface controller, outputting an output data flow identical in information content compared to said communication packets from said network interface controller into said transitory memory.

12. The method according to claim 8, comprising:

decoding incomplete, incorrect and damaged packets at least partially.

13. A computer program product embodied on a non-transitory computer readable medium, comprising computer program code configured to, when executed on at least one processor, cause an apparatus or a system to:

receive a split signal by a network interface controller from a split point in a communication network, said split signal formed of a communication signal by said split point, said communication signal comprising information, said split signal being identical in information content to said communication signal, capture communication packets of said split signal using a network interface controller into a transitory memory in a direct memory access operation without filtering or coalescing said communication packets by said network interface controller, said network interface controller operating in real promiscuous mode, read data of said communication packets from the transitory memory in a direct memory access operation; and write data of said communication packets to a non-transitory memory in a direct memory access operation so that the data of said communication packets is identical in information content to said communication signal;

form a verification code on the basis of said communication packets configured to be used to show that the data of said communication packets in the non-transitory memory has not been tampered with;

store the verification code to a secure location;

operate a virtual network interface controller from an isolated user space container, said isolated user space container having access to said transitory memory as an isolated memory range, capture said communication packets into said isolated memory range of said isolated user space container, and write said data of said communication packets from said isolated memory range to said non-transitory memory.

14. The computer program product according to claim 13, wherein said isolated user space container comprises an isolated non-transitory memory range of said non-transitory memory, the computer program product further comprising computer program code to:

write said data of said communication packets from said isolated memory range to said isolated non-transitory memory range of said non-transitory memory; and provide external access to said isolated namespace and said isolated non-transitory memory range, wherein said external access is provided in read-only mode.

15. The computer program product according to claim 13, comprising computer program code to:

decode said communication packets by said network interface controller, output an output data flow identical in information content compared to said communication packets from said network interface controller into said transitory memory.

16. The computer program product according to claim 13, wherein said communication network comprises one or more perimeters and said split signal is formed at a perimeter location of said communication network, and said capturing of communication packets comprises capturing both inbound and outbound packets, internal packets at the perimeter location, and external packets arriving to the perimeter location from outside and said communication packets comprise essentially all network traffic flowing through and at said perimeter location in a time span.

17. The computer program product according to claim 13, comprising computer program code to:

decode incomplete, incorrect and damaged packets at least partially.

* * * * *